United States Patent [19]

Schmiesing

[11] 3,889,979

[45] June 17, 1975

[54] AUTOMATIC HITCHING DEVICE

[76] Inventor: Gregory E. Schmiesing, R.R. No. 1, New Bremen, Ohio 43107

[22] Filed: Nov. 21, 1973

[21] Appl. No.: 417,820

[52] U.S. Cl.............................................. 280/446 R
[51] Int. Cl.............................................. B60d 1/10
[58] Field of Search..... 280/446 RA, 477, 515, 504, 280/508, 491 R, 479 R, 421, 422

[56] References Cited
UNITED STATES PATENTS

| | | | |
|---|---|---|---|
| 1,939,463 | 12/1933 | Rockinger | 280/508 |
| 2,453,139 | 11/1948 | Kleinkort | 280/504 |
| 2,937,887 | 5/1960 | Richman | 280/508 |
| 3,151,885 | 10/1964 | Johnson | 280/508 X |
| 3,330,579 | 7/1967 | Tantlinger | 280/508 |

Primary Examiner—David Schonberg
Assistant Examiner—R. Schrecengost
Attorney, Agent, or Firm—Jerome P. Bloom

[57] ABSTRACT

Hitch mechanism as used for example in agricultural machinery where a selected piece of work performing equipment, representing a towed vehicle, is selectively coupled to and uncoupled from a tractor or harvesting machine representing a towing vehicle. The coupling and uncoupling operations are effected under remote control, as by an operator seated in the towing vehicle. An extensible and retractable hitch pin is made remotely actuable and concepts of automation are present in that a relative approaching motion of the vehicles is used to activate the movement of the pin to effect, at the proper moment, a connecting or coupling of the vehicles. In different illustrated forms of the invention embodiment the hitch pin responds to hydraulic and electromechanical actuation. Appropriate controls are provided, including manual means, to selectively condition the hitch pin for its required movements. The hitch pin becomes a power operated device, the movements of which are under remote and automatic control.

23 Claims, 12 Drawing Figures

AUTOMATIC HITCHING DEVICE

BACKGROUND OF THE INVENTION

This invention relates to hitch mechanism useful in the releasable coupling of towed and towing mobile equipment. It has particular advantage in application, for example, to agricultural machinery and will be so described for purposes of illustration but not by way of limitation.

Agricultural fields are variously tilled, seeded, harvested and otherwise worked, using specialized equipment towed behind a self-powered tractor or harvester. The coupling of the towed equipment to the tractor, and its uncoupling therefrom may require only the placement and removal of a hitch pin. However, with conventional apparatus it is either a two-man operation, or, in the alternative, requires the tractor operator to descend from his seat, effect the required coupling or uncoupling and then return to his seat for further operation of the tractor. The frequency of coupling and uncoupling operations can be quite high in any given work period, so that the time and effort involved maya seriously affect work efficiency.

Insofar as is known, the prior art offers no successful instance of automated coupling involving the use of a simple hitch pin as here required.

SUMMARY OF THE INVENTION

The instant invention has in view both automated and remote hitch pin operation. The hitch pin is effectively integrated into power operated means, control elements of which may conveniently assume the form of hydraulic or electro-mechanical means. The control systems employed will include various control components at least one of which is located to be conveniently accessible to an operator in the towing vehicle so that he can effect a hitch pin operation without leaving his seat. In one inventive embodiment the control system includes a control part, adjustable to cause extending and retracting motions of the hitch pin, conditioned for adjustment by a variety of means. The concept of automation is applied by the use of means arranged in the invention control system to respond to a relative approaching motion of towed and towing vehicles to automatically extend the hitch pin at an appropriate point in such relative motion. According to illustrated embodiments of the invention, the power operated hitch pin and principal components of the control system mount to a draw bar extending rearwardly of the tractor or towing vehicle. The use of special coupling mechanisms in connection with the towed vehicle is unnecessary.

Structure provided in accordance with the invention may include a means to guide or center the projecting tongue of a towed vehicle in the tractor draw bar during a relative approaching motion, in order that the parts may be properly positioned for placement of the hitch pin.

A primary object of the invention is to provide hitching mechanism which is simple to fabricate, more efficient and satisfactory in use and adaptable to a wide variety of applications.

An additional object of the invention is to provide hitch mechanism including a power operated hitch pin which can be remotely controlled.

Another object of the invention is to enable a tractor or like operator to accomplish coupling and uncoupling operations with respect to towable equipment without leaving his seat in the tractor.

A further object of the invention is to introduce a concept of power operation into hitch pin actuation and to provide for use therewith a control system lending itself variously to manual, automatic and remote operation.

A still further object of the invention is to provide for an automatic coupling of a tractor or like towing vehicle to an auxiliary, towable, vehicle in response to a predetermined relative approaching motion of complementary portions thereof.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawings wherein are shown some but obviously not necessarily the only forms of embodiment of the invention.

Like parts are indicated by similar characters of reference throughout the several views.

DESCRIPTION OF PREFERRED EMBODIMENTS

The invention equipment is here described as applied to the rear of a tractor type vehicle or harvesting machine which is to be frequently coupled to and uncoupled from various work performing equipment having an apertured tongue or like hitch portion for coupling purposes. It should be understood, however, that the application of the invention is not so limited. It may be used in various manner and particularly to the rear or front of any mobile unit connected to another mobile unit, at least one of which is powered to move the other in tandem.

FIGS. 1–5 of the drawings show a fragment of a draw bar 10 which is fixed to and projects rearwardly of a tractor. In the case illustrated the bar 10 is arranged to couple with a tongue 11 forming part of a working performing mobile unit. Neither the tractor nor the work performing unit is otherwise illustrated since the detail thereof is not required for an understanding of the present invention.

As shown, the tongue 11 has a bifurcated configuration providing it with upper and lower portions adapted to receive therebetween the rearwardly projected end of the draw bar 10. The upper and lower portions of the tongue include vertically aligned apertures 12 and 13. The bar 10 has a corresponding aperture 14. The direct vertical alignment of the aperture 14 with the apertures 12 and 13 provides for passage therethrough of a hitch pin 20 which serves to couple the draw bar 10 to the tongue 11.

In the case illustrated it is contemplated that the tractor will be operated to cause the draw bar 10 to approach and enter the tongue 11. To guide the parts to a proper alignment, the respective sides of the draw bar 10 each hingedly mount a spring biased control arm, one being identified by the numeral 16 and the other by 17.

The control arms 16 and 17 are each slotted to receive therethrough a screw stud 18. The expanded head of the stud 18 serves, in each case, as an abutment for one end of a compression spring 19 which is coiled about the stud to have its other end abut and bias the related arm against the outer end of a boss 22, in which the screw stud 18 is threadedly engaged. The bosses 22 are fixed to the sides of the draw bar 10 and the arms 16 and 17 are so arranged to pivot at their forwardmost ends and diverge in a sense rearwardly and outwardly of the draw bar. Since the vertical extent of the arms 16 and 17 is such they project upwardly of the bar 10, on engagement thereof with the rounded leading end surface 11' of the tongue 11 they influence the tongue to axially align with the rear end of the draw bar 10 and to vertically align the apertures 12 and 13 with the aperture 14. This condition will result as the tongue 11 is guided to its coupling position between the pivoted inner ends of the control arms 16 and 17.

In accordance with a preferred embodiment of the invention, as the alignment of apertures 12, 13 and 14 occurs, the hitch pin 20 will be thrust therethrough in an automatic response to the engagement and forward movement of an anti-friction roller 57 by the leading end 11' of the tongue 11. This will be further described.

The hitch pin 20 may be intergral with or connected with a piston rod forming part of a hydraulic cylinder unit 29. The unit 29 is fixed to depend perpendicularly from a bracket 28 positioned at right angles to the upper end of a plate 27. The latter mounts perpendicular to and extends upwardly from the draw bar 10, in a plane adjacent to but spaced forwardly of the aperture 14.

As conventionally provided, a piston head (not shown) bears with the interior of the cylinder 29 to form therein two chambers, into the upper one of which is connected a conduit 32 and into a lower one of which is connected a conduit 33. Connected with the piston head is the piston rod of which the hitch pin 20 forms an axial extension, the axis of which rod is substantially coincident with the center of the aperture 14 therebelow. A supply of hydraulic fluid is moved to and from the conduits 32 and 33 by way of a valve device 34. It will be understood in this connection that vehicles such as tractors used in agricultural and like pursuits are equipped to supply both electrical power and hydraulic fluid under pressure, either one or both of which can be brought by appropriate lines to the invention control mechanism. In this case a source of hydraulic fluid under pressure is communicated with the valve 34 by way of a conduit 35.

As will be noted the whole of the invention system is generally diagrammatically or schematically illustrated for simplicity of disclosure.

The valve 34 may be a commercially available device embodying within a chamber thereof, in known manner, a three-position reciprocable, axially adjustable control element (not shown). This control element is optionally moved to either end of said chamber, into which are respectively connected the conduits 32 or 33, to direct a flow of pressure fluid to one end of the cylinder 29 or the other by way of either the conduit 32 or 33 in an obvious manner. It has a third or neutral position intermediate the ends of the control chamber wherein it blocks flow of fluid to or from the source of supply and thereby blocks flow of fluid to or from the cylinder 29. The valve 34 mounts with one end thereof in a fixed abutting relation to the forwardly facing side of the plate 27, which side is remote from the rearwardly projected outer end of the draw bar 10. As seen in the drawings, projected from the body of the control element and the opposite or forward end of the valve housing is a control rod 36. The outer end of the rod 36 is pivotally connected to an intermediate portion of a generally vertically orienting control arm 37.

Figures 1, 2, 3, 4, 5:
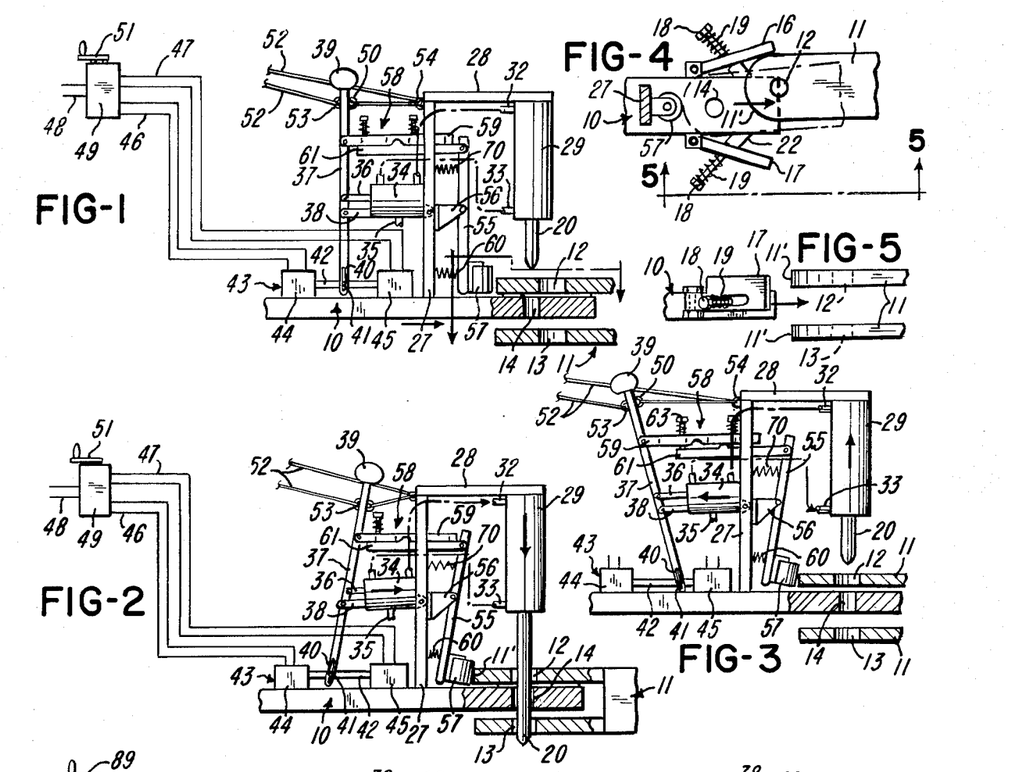
FIG. 1 is a partly diagrammatic view of a hitch pin mechanism and associated control system in accordance with an illustrated embodiment of the invention, the parts being shown in a position they assume with the hitch pin retracted and complementary portions of the towing and towed vehicle moving to a position to be releasably coupled together by projection of the hitch pin.
FIG. 2 is a view similar to FIG. 1, showing the parts in the position they assume with the hitch pin projected to a coupled position, as a result of relative approaching motion of complementary portions of the towing and the towed vehicles.
FIG. 3 is a view similar to FIG. 2 with parts in the position they assume when the control system is activated to withdraw the hitch pin, releasing the coupled vehicle portions.
FIG. 4 is a fragmentary view taken substantially along the line 4—4 of FIG. 1.
FIG. 5 is a fragmentary view in side elevation taken substantially along the line 5—5 of FIG. 4.
Figure 6:
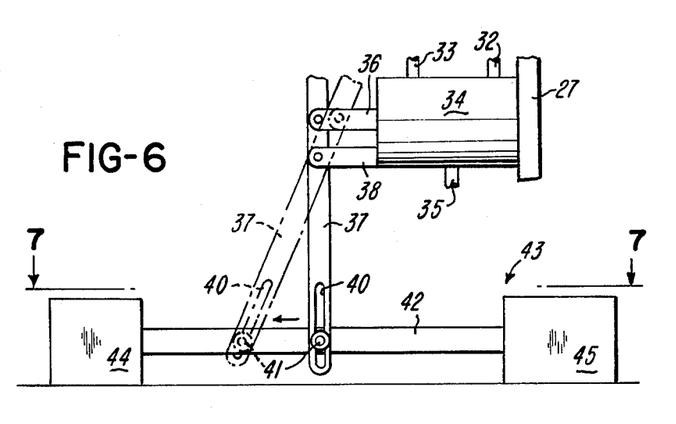
FIG. 6 is an enlarged view of a detail of FIGS. 1–5.
Figure 7:
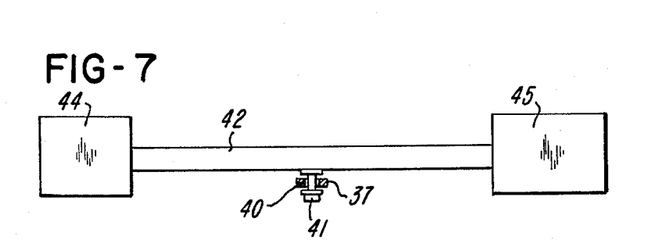
FIG. 7 is a view taken on line 7—7 of FIG. 6.
Figure 8:
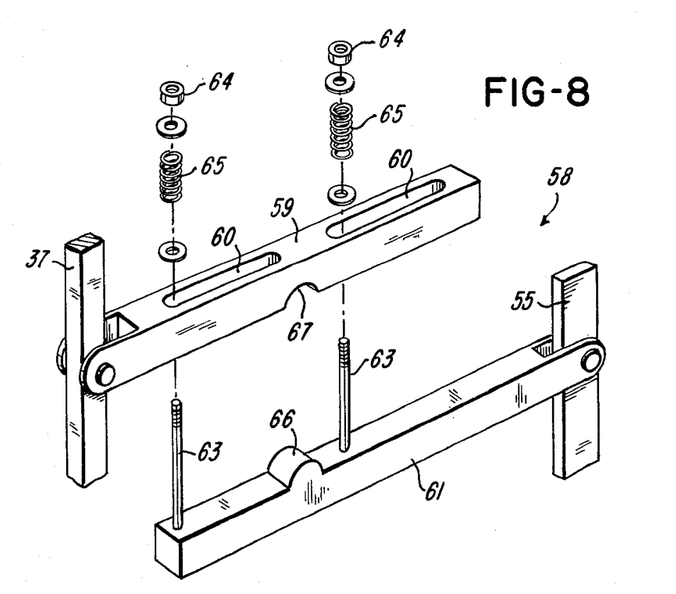
FIG. 8 is an exploded view of a detail of FIG. 1–5.

FIG. 1 of the drawings shows the control rod 36 and control arm 37 in an intermediate or neutral position from which they may be adjusted to opposite extreme positions, shown respectively in FIGS. 2 and 3.

At a point adjacent and spaced immediately below its pivotal connection to the reciprocable rod 36, the arm 37 is pivotally connected to a mounting bracket 38 fixedly attached to and projected from the forward end of the valve housing. The upper end of the arm 37 carries a knob 39 which facilitates its manual operation, if the occasion so requires. The lower end of the arm 37 has a longitudinally extended slot 40 slidably accommodating a pin 41. The latter is set in and projects laterally of a rod 42 forming a connecting part of a double acting solenoid assembly 43.

As diagrammatically shown in the drawings, the solenoid assembly 43 comprises a pair of solenoid units 44 and 45 which are axially aligned and longitudinally spaced. The solenoid cores, which project from the adjacent ends of the units 44 and 45, are connected to and coupled in a coaxial relation by the rod 42. As thus provided, the assembly 43 is a known electromagnetic apparatus made operative by the selective energizing of either the unit 44 or the unit 45, whereby to effect a desired axial movement of the rod 42 in one direction or the other. As will be obvious, since the pin 41 in this case bears within the lower end of the arm 37, the movement of rod 42 will, through the medium of the pin 41, accomplish a rocking motion of the arm 37 about its pivotal connection to the bracket 38. This will, in turn, effect an axial adjustment of the control rod 36 and a consequent adjustment of the valve 34 to determine the direction of flow or lack of flow of hydraulic fluid under pressure, to and from the cylinder 29.

As diagrammatically shown in the drawings, feed lines 48 connect a source of power to a conventional rotary switch 49, from which extend power feed lines 46 and 47 connecting respectively to the solenoid units 44 and 45. The rotary switch 49 has a manually adjustable switch operating member 51, the movement of which from a neutral position may serve in the usual manner to selectively energize either the solenoid unit 44 or 45 to move the rod 42 in a desired direction. In accordance with the known mode of operation of electrical switches of the type represented by the switch 49, a neutral position of the member 51 will prevent a supply of power to either of the solenoid units.

In the case of the solenoid assembly 43, and with the structure as here provided, with the selector switch 51 in its neutral position and both solenoid units 44 and 45 deenergized, the rod 42 and the connected solenoid cores will be free to relatively reciprocate. This is to accommodate a situation which requires that the movements of the arm 37 be effected by other than by the energizing of either the solenoid units. In such a situation, as will be seen, one may grasp the knob 39 to rock the arm 37 about its pivotal connection to the bracket 38, in one direction or the other, to selectively move the control member in the valve device 34 and thereby control the flow of fluid to and from the cylinder 29. In the example illustrated in FIG. 1 of the drawings, under conditions where the solenoid units 44 and 45 are both deenergized, the arm 37 may also be selectively rocked through the medium of a cable 52. As shown, one end of the cable 52 connects to an ear 53 at the forwardmost side of the arm 37 and the other end is first threaded through an aperture in a bracket 54 fixed to the plate 27 to the rear of the arm 37 and then attached to an ear 50 fixed to and projected from the rearmost side of the arm 37. The central or intermediate portion of the cable 52 is directed (by means not shown) to a position accessible to the operator of the tractor or other vehicle in which this aperture is embodied. As is obvious, while maintaining his seat, the operator of the tractor can apply a pulling force to one end of the cable 52 or the other and rock the arm 37 accordingly in one direction or the other to position the valve control element as desired.

As previously described, the operator can also effect a remote control of solenoids 44 and 45 by means of the immediately available rotary switch 49. A selected positioning of the operating member 51, which is located adjacent his seat, can connect the feed lines 48 to the lines 46 to energize the solenoid unit 44 or connect the lines 48 to the lines 47 to energize the solenoid unit 45. Thus, absent an automatic control of the hitch pin in a manner to be further described, one may obviously control the arm 37 in various manner whereby to induce an appropriate control of the valve 34 and a selective projection or retraction of the hitch pin 20.

In the preferred embodiment of the invention illustrated in FIGS. 1–8 of the drawings, means are provided to automatically operate the control arm 37 by an actuation of a trip lever 55. The lever 55 is pivotally connected intermediate its ends to a bracket 56 fixed to the rearmost face of the plate 27. Projected from the rear face of the lever 55, at its lower end, is a bracket which pivotally supports a vertically oriented antifriction roller 57. Where the tongue 11 is of sufficient length, as illustrated in FIG. 2, to have its rounded forward end 11' engage the roller 57 to rock the trip lever 55 as the aperture 14 aligns with apertures 12 and 13, the trip lever will rock the arm 37 through the medium of a slide assembly 58.

In its inactive or neutral position the lever 55 has a substantially vertical orientation and is located in a position generally parallel to and rearwardly offset from the plate 27. Assisting the lever 55 to maintain this position are a pair of biasing springs 60 and 70. The spring 60 is positioned intermediate the plate 27 and the lever 55 below the bracket 56 while the spring 70 is positioned between the plate 27 and the lever 55 above the bracket 56. The function of the springs and the desirability thereof will soon become obvious. Thus arranged, the lever 55 is located in a position immediately forward of the cylinder 29. At its lower end the lever 55 approaches the bar 10 and carries at its rearward face the previously mentioned anti-friction roller means 57 the axis of which has a vertical orientation and lies in a plane commonly occupied by the center of the aperture 14 in the draw bar 10.

The slide assembly 58 is a mechanical device tending normally to provide a direct connection between the arm 37 and the lever 55 so that a motion of one of these elements results in a corresponding and like motion of the other. However, the assembly 58 also provides means for a yielding thereof so that under stress a rocking motion of either the lever 55 or arm 37 can be accomplished with movement of one relative the other. For the latter purposes the assembly 58 includes a pair of superposed bar-like elements 59 and 61 which are capable of free sliding movement with one bearing on the other, the element 59 providing a pivotal connection at one end to the arm 37 and the element 61 providing a pivotal connection at its remote end to the trip lever 55. The upper bar 59 includes a pair of longitudinally extending longitudinally spaced, slots 60. The slots 60 each accommodate the projection therethrough of a bolt 63. In the example illustrated, the expanded heads of the bolts 63 abut the undersurface of the lower bar element 61 while their threaded extremities project therethrough and upwardly through the slots 60 of the upper bar element 59. Above the bar 59, the upper extremity of each bolt is threadedly engaged by a nut 64. Positioned about the upwardly projected threaded extremity of each bolt 63 is a spring 65 contained against the upper surface of the upper bar element 59 by the associated nut 64. Suitable washers are applied between the upper end of each spring and its containing nut to facilitate the containment and the selective compression of the spring. It will therefore be seen that by selective adjustment of the nuts 64 one may, through the medium of the springs 65, apply a yielding pressure tending to maintain a bearing interrelation of and frictional connection between the bar elements 59 and 61. Intermediate its ends, the upper surface of the lower bar element 61 has a vertically projected rounded protuberance 66 received normally in a mating recess 67 formed in the undersurface of the immediately superposed bar element 59. As may be seen, obviously with the nesting of the protuberance 66 in the recess 67 and the springs 65 under compression, the bar elements 59 and 61 will be suitably and frictionally connected so that the movement of one of the trip lever 55 or the arm 37 will produce a direct and corresponding movement of the other. Nevertheless, with the structure provided, in the presence of sufficient force applied to either the lever 55 or the arm 37, where there is a resistance to movement of the other, the connection accommodates a yielding and relative movement of the bar elements 59 and 61 in a longitudinal sense. This provides for and enables that the protuberance 66 ride out of the recess 67, but only to the extent permitted by the limits of the slots through which the bolts 63 project. At this point the projection 66, in abutment with a portion of the undersurface of the bar 59, at a point intermediate the bolts 63, creates otherwise a separation of the bars 59 and 61. Once there is a yielding separation as described, obviously there can be an oppositely applied force which brings the bar elements back into their interengaged superposed positions such as shown in the accompanying drawings, under the influence of the energy stored in the springs 65 by their original displacement. This of course occurs once the protuberance 66 realigns with the mating recess 67.

It will be obvious, of course, that the plate 27 is suitably apertured to accommodate the projection therethrough and the free movement of the assembly comprising the bar elements 59 and 61 and their associated structure.

In an automatic operation of a hitch mechanism and control system as shown in FIGS. 1 to 8, the towing vehicle in which they are embodied is moved to direct the draw bar 10 to the tongue 11, as from a position such as shown in FIG. 5, through an intermediate position as shown in FIG. 1, to a position for coupling as shown in FIG. 2. During such movement, the hitch pin 20 is in the retracted or non-coupling position shown in FIG. 1. As the draw bar 10 moves through the intermediate position of FIG. 1 toward the position of FIG. 2, the forward end of tongue 11 will first be engaged (FIG. 4) by one or both of the arms 16 and 17 to be urged thereby in a direction to center in respect to the draw bar 10. As shown in FIG. 4, as the forward end of tongue 11 positions between the inner ends of the arms 16 and 17, the advance portion of its surface 11' will be contacted by the anti-friction roller 57. Continued relative movement of the tractor causes the trip lever 55 to rock from a position such as shown in FIG. 1 substantially to a position as shown in FIG. 2. In the course of the movement of the lever 55 as described, as the roller 57 comes into contact with and is pressured by its engagement with the tongue 11, the latter is caused to be positioned relative to draw bar 10 to align its apertures 12 and 13 with the draw bar aperture 14. Of course, the determination of this position is assisted and controlled by the arms 16 and 17, as will be understood and as heretofore been described.

The rocking motion of lever 55 determines the relative movement of the tractor and the tongue 11 on the device to be towed and becomes effective, through the assembly 58, to produce a corresponding rocking movement of control arm 37. In this instance, as viewed from FIG. 2 of the drawings, the movement of the arm 37 is clockwise, about its pivot to the mounting bracket 38. Accordingly, the control rod 36 is correspondingly moved inwardly of the valve device 34 to adjust the position of the control element therein from a neutral position, wherein no pressure fluid is supplied to either end of cylinder 29, to a first operating position in which pressure fluid is supplied through conduit 32 to an upper part of cylinder 29. This induces a downward movement of the piston therein in connection with hitch pin 20 and a movement of pressure fluid out of the lower part of the cylinder 29 by way of conduit 33. The result is to effect a downward movement of the hitch pin 20 which, by virtue of its alignment with aperture 14, passes through the apertures 12, 13 and 14, which are aligned at this time. This effectively locks or couples the tongue 11 to the draw bar 10. In this locked or coupled position of the parts, the spring 60 backing the lower end of the trip lever is compressed to store energy and the spring 70 backing the upper end of the lever is stressed.

The positive and easy automatic hitching procedure as enabled by the invention produces a coupling of parts which cannot be readily uncoupled except through a positive force being applied to the arm 37. The hitch is therefore safe and quite unlikely to be tripped inadvertently.

When a point in time is reaches that the operator of the tractor or towing vehicle may desire to uncouple the towed device, he may simply adjust the selector switch 49 through the medium of its operator member 51, to energize solenoid unit 45. This has the effect of moving the connecting rod 42 to the right as seen in FIG. 3. By virtue of the bearing engagement of the pin 41 in the lower end of the rod 37, there is a corresponding counterclockwise movement of the arm 37. This will inherently cause an adjustment of the position of the control member within the valve 34 to provide that pressure fluid is directed to the lower end of the cylinder 29 to move the piston therein upwardly, in a sense to lift the hitch pin 20. Of course, with the arrangement provided, in the process, the pressure fluid in the upper end of the cylinder 29 will be directed outwardly of the cylinder 29 by way of conduit 32 and back to the source of supply.

It will be observed from FIG. 3 that at the time the lever 37 is rocked counterclockwise that the trip lever 55 is still under the influence of its contact with the tongue member 11. This last determines and maintains a relatively fixed position of the bar member 61 of the assembly 58. Since the position of the bar element 61 is relatively fixed, as the arm 37 is rocked counterclockwise, it will carry with it the bar element 59, the yielding capabilities of this assembly coming into play. As this occurs, the springs 65 accommodate the lift of the bar element 59 so as to clear the protuberance 66 from the recess 67. Of course, the limited length of the slots accommodating portions of the bolts 63 will limit the relative displacement of the bar element 59 in a sense longitudinally of the bar element 61.

Accordingly, by a simple switch control the tractor operator may from his seat, remotely cause the function of the arm 37 to withdraw the hitch pin 20 from its coupling relation to the draw bar 10 and the tongue 11. The towing vehicle may then be moved to clear the tongue 11, whereupon the energy stored in the springs 60 and 70 will function to bias the lever 55 to its normal generally vertical orientation.

Value device 34 will conventionally incorporate spring means, by means of which the control element thereof may be caused to self center to a neutral position. Thus, with the solenoid unit 45 deenergized and the pressure on the tip lever 55 relieved, the self centering action induced in both the lever 37 and the lever 55 will result in the bar elements 59 and 61 being returned to their normal superposed position such as illustrated in FIG. 1.

With the unhitching operation completed the hitch pin 20 is elevated and held retracted, sufficiently clear of the draw bar 10 that the tractor may be moved to couple the same to another piece of working equipment.

It will be readily obvious that if for some reason or other there is difficulty in operating the switching device to serve its intended purpose, the operator can rock the arm 37 counterclockwise to initiate the lifting of the hitch pin 20 through the medium of the cable 52, the force to rock the arm 37 being applied to that end of the cable which attaches to the forward side of the arm. Also, if for any reason the operator of the vehicle or third party happens to be adjacent the draw bar at the time when unhitching is desired, the operator may grasp the knob 39 and through the medium thereof rock the lever 37 counterclockwise.

It may be further seen that in the event the form of the tongue or other coupling member on the device to be coupled is such that in effecting alignment of the apertures through which the hitch pin is to be projected there can be no contact of the roller 57, then in the case when the apertures 12, 13 and 14 are brought into alignment one can effect the projection of the hitch pin to a coupling position wherein the pin is extended through the aligned apertures by energizing the solenoid 44. This last will move the connecting rod 42 to rock the lever 37 clockwise with the same results as effected when the lever 55 may be tripped by the tongue 11. Similarly, if required, the projection of the hitch pin may obviously be effected by rocking the lever through the medium of the cable 52 or on grasping the knob 39.

The invention thus contemplates a choice of a variety of means by which a hitching or unhitching operation may be effected utilizing a preferred embodiment of the invention such as illustrated in FIGS. 1 through 8 of the drawings.

Figures 9, 10, 11, 12:
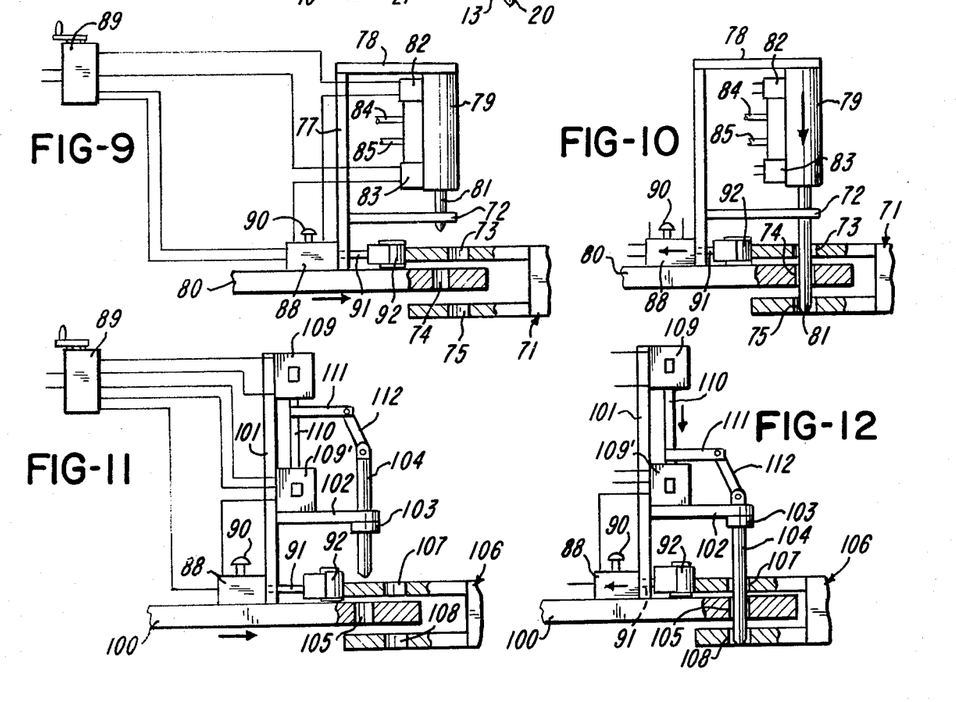
FIG. 9 is a view similar to FIG. 1, showing a power actuated hitch pin and control system therefor in accordance with another illustrated embodiment of the invention.
FIG. 10 is a view like FIG. 9, showing the hitch pin in a projected or coupling position.
FIG. 11 is a view like FIG. 9, showing a further illustrated embodiment of the invention.
FIG. 12 is a view like FIG. 11, showing the hitch pin in a projected or coupling position.

A modified form of embodiment of the invention is shown in FIGS. 9 and 10 of the drawings. In this instance a draw bar 80 in connection with a towing vehicle mounts a hydraulic actuating cylinder 79 through the medium of a right angled plate structure 77–78 in substantially the same manner that the draw bar 10 has been described to mount the cylinder 29. Also, the cylinder 79 is similar to the cylinder 29 in that it has means therein responsive to the application of fluid pressure to project or retract an axially related hitch pin 81. As shown in FIG. 9, intermediate its vertical limits the plate structure 77 has fixed thereto and projected horizontally therefrom a guide 72. The hitch pin 81 projects through an aperture in the guide 72 and is thereby laterally restricted and stabilized as it is projected from and retracted towards the cylinder 79. The bar 80 includes an aperture 74 arranged to be moved to and coordinated with a portion of a mobile unit to be towed, which is here represented by a tongue 71 similar to the tongue 11. The tongue 71 includes apertures 73 and 75 which in a hitching operation are caused to be placed in alignment with the aperture 74 for projection therethrough of the hitch pin 81.

In this second illustrated embodiment of the invention the flow of pressure fluid into and from the cylinder 79 is controlled by electromagnetic valve devices 82 and 83 mounted directly to the respective ends of the cylinder 79. These valve devices 82 and 83 are diagrammatically shown and conventionally connected to a source of hydraulic fluid under pressure which is provided in the mobile unit in which the invention structure is embodied. Flow to and from the cylinder 79 is effected by way of conduits 84 and 85. The devices 82 and 83 are known articles of commerce, each embodying control means energizable to pass pressure fluid to or from the cylinder 79 or to deny flow in respect thereto. The devices 82 and 83, as shown in FIG. 9, are included in electrical circuits to provide that they are under the optional control of a switch unit 88 mounted on the draw bar 80 immediately forward of the plate structure 77 or a selector switch 89 which is similar in nature to the selector switch 49. Like the switch 49, the selector switch 89 is positioned adjacent the operator seated in the tractor or other vehicle embodying the invention structure. The switch unit 88 has a manual control 90 but it also embodies an alternate control in the form of a plunger-like control element 91 which projects from the switch housing through an opening in the plate structure 77 to mount at its projected extremity a vertically orienting anti-friction roller 92 similar in nature to the roller 57 and adapted similarly to be moved by appropriate contact with the tongue member 71 on the device to be hitched, as the aperture 74 in the draw bar is brought into a vertical alignment with the apertures 73 and 75 of the tongue 71. The inward thrust of the plunger type control element 91 through contact with the roller 92 serves to close a circuit to energize the valve unit 82 to direct hydraulic fluid to the upper portion of the cylinder 79 while the valve 83 is conditioned to pass hydraulic fluid from the lower portion of the cylinder 79. It will therefore be obvious that this will cause the piston unit within the cylinder 79 to project the axially related hitch pin 81 to move through the aligned apertures 73, 74 and 75. This effects an automatic hitch of the tractor or like vehicle embodying the draw bar 80 to the mobile unit to be towed. It is noted that the plunger 91 has means (not shown) associated therewith normally inducing a projected position thereof, in which case the switch 88 is not closed, it being understood that the control 90 for the switch 88 will normally be in a neutral position. In the event the apertured portion of the device to be hitched is of a configuration that cannot be contacted by the roller 92 to move the plunger 91 to an operating position as apertures 73 and 75 are aligned with the aperture 74 in the draw bar, the operator of the vehicle can move his selector switch 89 to manually but remotely from the draw bar 80 to effect a control of the valve devices 82-83 to project the hitch pin 81 and effect a hitching operation. Also, in the event desired, the same operation can be achieved by someone operating the control element 90. It will be understood that in this case the switch unit 88 is a three-position switch, as is the selector switch 89. Therefore, one may, at his option, control the electromagnetic valve units 82 and 83 from the position of either switch as circumstances might dictate to be convenient and there still remains the control element 91 through the medium of which an automatic hitching operation may be effected as described. The electromagnetic valve devices 82 and 83 are contemplated to be of the self-centering self-adjusting type which in absence of a supply of energizing current will assume a neutral position denying flow to or from the cylinder 79.

FIGS. 11 and 12 of the drawings show a further modified embodiment of the invention which does not require the use of pressure fluid. In this embodiment, as illustrated, a draw bar 100 in connection with the towing vehicle carries a perpendicularly projected mounting plate 101 from intermediate the vertical extremities of which projects a horizontally oriented guide arm 102. The arm 102 embodies at its projected extremity, spaced to the near of the plate 101, a vertically oriented bearing 103 through which projects a vertically orienting hitch pin 104. The hitch pin 104 is slidably mounted in the bearing 103 in a direct axial alignment with an aperture 105 in the draw bar 100 therebelow. A tongue member 106 having a configuration and construction corresponding to that of the tongue 11 is represented as the coupling portion of the device to be hitched to the towing vehicle embodying the draw bar 100. The tongue portion 106 has apertures 107 and 108 which are caused to be in alignment with the aperture 105 when they are properly positioned for coupling. In this embodiment of the invention one may employ a three-position switch 88 and a three-position selector switch 89 such as used in the embodiment of FIGS. 9 and 10 and similarly positioned. The switches 88 and 89 are incorporated in electrical circuitry for control of the hitch pin 104. However, rather than connecting with electromagnetic valve devices, they respectively connect with and are adapted to selectively energize vertically spaced solenoid units 109 and 109' which are fixed to the rearmost face of the plate 101. The cores of the solenoid units are coupled by a connector rod 110 which orients in a parallel relation to the plate 101 and has fixed thereto and projected horizontally therefrom a control arm 111. The solenoid units 109 and 109' together with the rod 110 thus provide a double acting solenoid assembly wherein vertical movement of the rod 110, dependent on which of the solenoid units is energized, will induce a vertical movement of the control arm 11. The projected end of the arm 11 terminates short of a vertical line which would form an axial extension of the hitch pin 104. Pivotally connected at one end to the projected extremity of the arm 111 and at its other end to the upper end of the hitch pin 104 is a link 112. As may be observed from FIGS. 11 and 12 of the drawings, the link 112 will in all instances have an inclined angular relation to both the arm 111 and the hitch pin 104. It has been found that in the vertical movement of the arm 111 under the influence of the rod 110 this angular relation of the link 112 insures a smoother and better function of the pin 104 in the hitching operation.

From the foregoing description of the subject matter of the FIGS. 11 and 12 of the drawings, it will be obvious that the automatic hitching operation is accomplished similarly to that enabled by the apparatus of FIGS. 9 and 10. Moreover, the switch units 88 and 89 may be caused to similarly function to selectively energize the solenoid units 109 and 109' in an obvious manner to either project or retract the hitch pin 104.

It will be evident that the double acting solenoid assembly described in reference to FIGS. 11 and 12 is but one non-pressure fluid operated means capable of accomplishing a projection or retraction of the hitch pin. Other means are available to substitute therefor, as for example the so-called electric cylinders which utilize an electrically powered motor and a screw shaft or like means to effect longitudinal projection and retraction of a work performing element. Such may be readily embodied in a manner as described by the invention to serve similar purposes.

Also, it will be self evident that the draw bar units of the various embodiments of the invention may each have incorporated therewith centering devices and control devices such as provided by the arms 16 and 17 and associated structure in the first described embodiment of the present invention. It is to be also understood that the coupling structure of the various devices which are intended to be hitched may have various forms and that the draw bar and tongue structures shown in the drawings are merely illustrative forms and not to be construed as limiting.

The invention embodiment is significant in that it lends facility and ease in accomplishing a hitching operation in various manner and by automatic and/or remote control to meet the needs of many applications.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. A hitch mechanism for use in the releasable connection of one mobile unit to another comprising coupling means in connection with said one mobile unit having at least two positions of adjustment in one of which said coupling means is adapted to positively engage a portion of the other of said mobile units so that movement of one unit will induce the movement of the other, means for effecting a powered operation of said coupling means, and control means for said powered operating means including triggering means, remote from said coupling means, operable to induce a selected position of adjustment of said coupling means.

2. Apparatus as in claim 1 wherein switch means provides an operative connection between at least a portion of said triggering means and said powered operating means.

3. Hitch mechanism as in claim 1 characterized by said control means including a plurality of triggering means providing optional means for inducing movement of said coupling means to one position of adjustment or another.

4. Apparatus as in claim 3 wherein at least one of said triggering means includes means for electrically activating said control means from a position on one mobile unit remote from said coupling means to induce movement of said coupling means to selective positions of adjustment including said position in which said coupling means is adapted to physically engage said other mobile unit.

5. Hitch mechanism as in claim 1 characterized by said triggering means including one portion responsive to physical contact by a portion of said other unit and other portions positioned for immediate access to an operator seated on one of said mobile units remote from said coupling means.

6. Apparatus as in claim 1 including hydraulic valve means for directing fluid under pressure to and from said coupling means to induce a selective adjustment of said coupling means under the influence of said triggering means.

7. Hitch mechanism as in claim 1 wherein said triggering means includes a movable member positioned exterior to said one mobile unit having means in connection therewith to signal a predetermined relative position of said units operating in response to physical contact thereof by a portion of said other unit to activate said powered operating means to induce movement of said coupling means to a position of adjustment to engage said other unit.

8. Hitch mechanism as in claim 7 wherein said means connected to said movable member is a switch device the function or non-function of which is determined by the position of said movable member.

9. Apparatus as in claim 1 wherein said coupling means is a hitch pin mounted on said one mobile unit and arranged to have a projected coupling position and a retracted uncoupling position.

10. Hitch mechanism as in claim 9 wherein said control means includes a reciprocable member operatively connected with said powered operating means to move said hitch pin to its respective positions of adjustment.

11. Apparatus as in claim 1 characterized by said control means including a movable arm operably related to said powered operating means the position of which arm determines the position of said coupling means, said arm being connected for actuation by at least a portion of said triggering means through the medium of a reciprocable member the direction and degree of movement of which determines the position of said coupling means.

12. Apparatus as in claim 11 wherein said powered operating means is arranged to direct fluid under pressure to actuate said coupling means, said arm is pivotally conected to said reciprocable member and to a valving means, the latter of which controls the flow of fluid under pressure to said coupling means to provide for placement of said coupling means in a selected position of adjustment in correspondence with the movement of said reciprocable member.

13. Apparatus as in claim 1 wherein said triggering means includes a pivoted arm exterior to said one mobile unit, said coupling means is a hitch pin, and said control means is arranged to respond to a predetermined movement of said pivoted arm to actuate said powered means to move said hitch pin to effect a coupling of said mobile units.

14. Apparatus as in claim 1 wherein said triggering means includes an arm moved and held in a moved position by a predetermined positioning of one of said units relative the other, said operating means includes valve means for directing fluid under pressure to effect projecting and retracting movements of said coupling means to respective coupling and uncoupling positions, a movable valve control arm and means including a lost motion connection providing for interconnection of said arms and for selective operation of said valve means in response to movements of said first mentioned arm.

15. Apparatus as in claim 14 characterized by a plurality of triggering means for optionally effecting a remotely initiated movement of said valve control arm.

16. Apparatus as in claim 1 wherein there are a plurality of said triggering means selectively actuable to responsively indcue a selected position of adjustment of said coupling means.

17. A hitch mechanism for use in the releasable connection of one mobile unit to another comprising coupling means in connection with said one mobile unit having at least two positions of adjustment in one of which said coupling means is adapted to positively engage a portion of the other of said mobile units, so that movement of one unit will induce the movement of the other, and control means for said coupling means including a triggering portion which is displaced from and operable at a location remote from said coupling means, to induce a selected position of adjustment thereof, and said control means further including a pair of electrically energized devices operatively related to said triggering portion and said coupling means, the energizing of one or the other of said devices being arranged to dictate the position of adjustment of said coupling means.

18. A hitch mechanism for use in the releasable connection of one mobile unit to another comprising a hitch pin in connection with said one mobile unit having at least two positions of adjustment in one of the other of said mobile units so that movement of one unit will induce the movement of the other, and control means for said hitch pin including a pivoted arm exterior to said mobile unit, said control means responding to a predetermined movement of said pivoted arm to move said hitch pin to effect a coupling of said mobile units, said hitch pin forming part of a hydraulic cylinder unit and being actuable to its various positions of adjustment by the selective application of hydraulic fluid in said cylinder, and valve means for controlling said application of hydraulic fluid under the influence of movement of said pivoted arm.

19. Apparatus as in claim 18 wherein a second pivoted arm is interposed between said first mentioned arm and said valve means and connected to said first arm for movement conjointly with and/or relative to said first arm, means providing the connection between said arms being adapted to extend and contract, in a longitudinal sense, to accommodate the relative movement of said arms as and when required.

20. Apparatus as in claim 19 wherein said second pivoted arm is under the control of a reciprocable member responsive to the actuation of alternate triggering means included for control of the position of said hitch pin.

21. A hitch mechanism for use in the releasable connection of one mobile unit to another comprising a hitch pin mounted on said one mobile unit and arranged to have a projected coupling position and a retracted uncoupling position with respect to the other of said mobile units, control means for said hitch pin displaced from and operable at location remote from said hitch pin to induce a selected positon of adjustment thereof, and means to furnish motive power to move said hitch pin to its respective positions of adjustment under control of a reciprocable member actuable under the influence of said control means, said reciprocable member being in coupled relation to a pair of spaced solenoids the selective energization of which induces a selected direction of movement thereof and determines the resultant position of said hitch pin.

22. A hitch mechanism for use in the releasable connection of one mobile unit to another comprising coupling means in connection with said one mobile unit having at least two positions of adjustment in one of which said coupling means is adapted to positively engage a portion of the other of said mobile units so that movement of one unit will induce the movement of the other, and control means for said coupling means including a plurality of selectively actuable triggering portions displaced from and operable at a location remote from said coupling means to induce a selected position of adjustment thereof, one of said triggering portions being a movable member exterior to said one of said mobile units actuable by a predetermined contact of the other of said units, and another of said triggering portions including a switch means, located adjacent the seat of the operator of said one unit, connected to supply power to responsively actuate said control means to selectively move said coupling means to a coupling or an uncoupling position of adjustment.

23. Apparatus as in claim 22 wherein said one of said triggering portions is operatively connected with a further switch means which responds to said predetermined contact to induce said coupling means to positively engage the other mobile unit and said first mentioned switch means is connected to trigger an uncoupling action.

* * * * *

UNITED STATES PATENT OFFICE
CERTIFICATE OF CORRECTION

Patent No. 3,889,979        Dated June 17, 1975

Inventor(s) Gregory Schmiesing

It is certified that error appears in the above-identified patent and that said Letters Patent are hereby corrected as shown below:

Col. 1, line 23, "maya" is corrected to read -- may --.

Col. 3, line 57, "intergral" is corrected to read -- integral --.

Col. 5, line 46, "aperture" is corrected to read -- apparatus --.

Col. 6, line 31, "element" is corrected to read -- elements --.

Col. 7, line 56, "assisited" is corrected to read -- assisted --.

Col. 8, line 24, "reaches" is corrected to read -- reached --.

Col. 8, line 65, "Value" is corrected to read -- Valve --.

Col. 9, line 1, -- when the selector switch 49 is set to a neutral position. -- is inserted following "tion".

Col. 9, line 2, "tip" is corrected to read -- trip --.

Col. 9, line 29, "the" (second occurrence) is corrected to read -- that --.

Col. 10, line 55, "to" is deleted.

(Continued)

FORM PO-1050 (10-69)

UNITED STATES PATENT OFFICE
CERTIFICATE OF CORRECTION

Patent No. 3,889,979          Dated June 17, 1975

Page - 2

Inventor(s) Gregory Schmiesing

It is certified that error appears in the above-identified patent and that said Letters Patent are hereby corrected as shown below:

Col. 11, line 43, "11" is corrected to read -- 111 --.

Col. 11, line 44, "11" is corrected to read -- 111 --.

Col. 13, line 19, (Claim 7), -- to signal a predetermined relative -- is deleted.

Col. 13, line 20, (Claim 7), -- position of said units -- is deleted.

Col. 14, line 12, (Claim 16), "indcue" is corrected to read -- induce --.

Col. 14, line 34, (Claim 18), -- which it is adapted to positively engage a portion of -- is inserted following "of" (second occurrence).

Col. 14, line 38, (Claim 18) -- one -- is inserted following "said" (first occurrence).

Col. 14, line 46, (Claim 18), "movement" is corrected to read -- movements --.

Col. 14, line 66 (Claim 21), -- a -- is to be inserted following "at".

Col. 14, line 67, (Claim 21), "positon" is corrected to read -- position --.

Signed and Sealed this eleventh Day of November 1975

[SEAL]

Attest:

RUTH C. MASON
Attesting Officer

C. MARSHALL DANN
Commissioner of Patents and Trademarks